US009996728B2

(12) United States Patent
Shah et al.

(10) Patent No.: US 9,996,728 B2
(45) Date of Patent: Jun. 12, 2018

(54) SYSTEM AND METHOD FOR PARTIAL FINGERPRINT ENROLLMENT AND MATCHING USING SMALL SIZE FINGERPRINT SENSORS

(71) Applicant: Samsung Electronics Co., Ltd., Suwon-si, Gyeonggi-do (KR)

(72) Inventors: Jidnya Samir Shah, Bangalore (IN); Ankit Vijay, Bangalore (IN); Balasubramanian Anand, Bangalore (IN); Rangavittal Narayanan, Bangalore (IN); Shankar Venkatesan, Bangalore (IN); Adil Hamid Malla, Bangalore (IN); Aloknath De, Bangalore (IN); Shreyasi Das, Bangalore (IN); Surbhi Mathur, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 15/008,114

(22) Filed: Jan. 27, 2016

(65) Prior Publication Data
US 2016/0217310 A1 Jul. 28, 2016

(30) Foreign Application Priority Data

Jan. 23, 2015 (IN) .............................. 332/CHE/2015
Jan. 21, 2016 (IN) .............................. 332/CHE/2015

(51) Int. Cl.
*G06K 9/00* (2006.01)
*G06F 21/32* (2013.01)
*G06K 9/32* (2006.01)

(52) U.S. Cl.
CPC ............. *G06K 9/001* (2013.01); *G06F 21/32* (2013.01); *G06K 9/00026* (2013.01);
(Continued)

(58) Field of Classification Search
CPC ............. G06F 21/32; G06F 2221/2117; G06K 9/00026; G06K 9/001; G06K 9/00912; G06K 9/00926; G06K 9/3208
See application file for complete search history.

(56) References Cited

U.S. PATENT DOCUMENTS 6,201,886 B1 * 3/2001 Nakayama ......... G06K 9/00006
  382/124
6,980,670 B1 * 12/2005 Hoffman ................. G06F 21/31
  382/115
(Continued)

FOREIGN PATENT DOCUMENTS

WO  WO 2012/138086   * 10/2012  ......... G06K 9/00087
WO  2014/004210 A1   1/2014

OTHER PUBLICATIONS

Takeo Kanade et al., Audio- and Video-Based Biometric Person Authentication, 5th International Conference, AVBPA 2005, Jul. 20-22, 2005, Hilton Rye Town, NY, USA.

*Primary Examiner* — Amara Abdi
(74) *Attorney, Agent, or Firm* — Jefferson IP Law, LLP

(57) ABSTRACT

A system and a method for enabling a fingerprint registration on a mobile device are provided. The mobile device includes a fingerprint registration unit configured to receive at least one first image of a fingerprint input in a first orientation, receive at least one second image of the fingerprint input in a second orientation, and generate a fingerprint image by stitching the at least one first image with the at least one second image such that the first orientation and the second orientation are substantially perpendicular to each other.

26 Claims, 20 Drawing Sheets

(52) U.S. Cl.
CPC ..... *G06K 9/00912* (2013.01); *G06K 9/00926* (2013.01); *G06K 9/3208* (2013.01); *G06F 2221/2117* (2013.01)

(56) References Cited

U.S. PATENT DOCUMENTS

| | | | |
|---|---|---|---|
| 7,853,055 B2* | 12/2010 | Machida | G06K 9/00899 382/124 |
| 2003/0228037 A1* | 12/2003 | Endo | G06K 9/00067 382/124 |
| 2005/0213173 A1* | 9/2005 | Sasaki | G06K 9/0004 358/514 |
| 2006/0140461 A1 | 6/2006 | Kim et al. | |
| 2006/0280346 A1 | 12/2006 | Machida | |
| 2007/0188838 A1* | 8/2007 | Chao | G03H 1/00 359/29 |
| 2008/0205714 A1* | 8/2008 | Benkley | G06F 3/03547 382/126 |
| 2008/0273767 A1* | 11/2008 | Lo | G06K 9/00087 382/124 |
| 2011/0216948 A1* | 9/2011 | Yalla | G06K 9/00 382/125 |
| 2012/0127179 A1* | 5/2012 | Aspelin | G06F 21/32 345/441 |
| 2013/0208084 A1* | 8/2013 | Brunner | H04N 5/23238 348/36 |
| 2013/0265416 A1* | 10/2013 | Enyedy | G06T 7/248 348/135 |
| 2014/0003678 A1* | 1/2014 | Vieta | G06K 9/00026 382/124 |
| 2014/0344921 A1* | 11/2014 | Hamlin | G06F 21/32 726/19 |
| 2015/0074615 A1* | 3/2015 | Han | G06K 9/00033 715/863 |
| 2015/0131876 A1* | 5/2015 | Chang | G06K 9/00013 382/124 |
| 2015/0161368 A1* | 6/2015 | Stewart | G06F 21/32 726/19 |

* cited by examiner

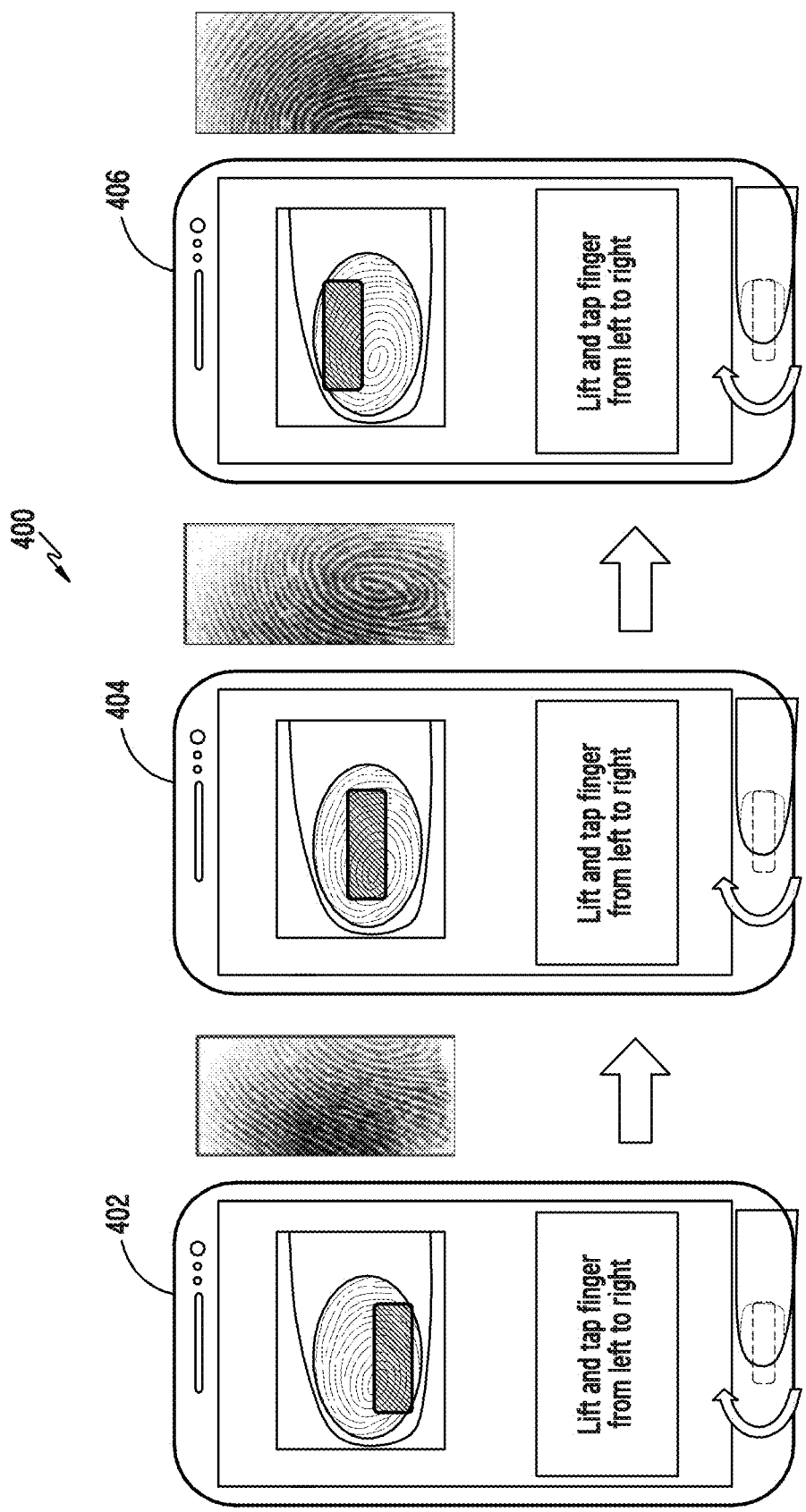

SYSTEM AND METHOD FOR PARTIAL FINGERPRINT ENROLLMENT AND MATCHING USING SMALL SIZE FINGERPRINT SENSORS

CROSS-REFERENCE TO RELATED APPLICATION(S)

This application claims the benefit under 35 U.S.C. § 119(a) of an Indian Provisional application filed on Jan. 23, 2015 in the Indian Patent Office and assigned Serial number 332/CHE/2015, and an Indian complete application filed on Jan. 21, 2016 in the Indian Patent Office and assigned Serial number 332/CHE/2015, the entire disclosure of each of which is hereby incorporated by reference.

TECHNICAL FIELD

The present disclosure relates to the field of biometric authentication. More particularly, the present disclosure relates to a system and method for fingerprint enrollment and matching using small size fingerprint sensors.

BACKGROUND

Biometric authentication can be achieved by using any of the biometric data that can include, but not limited to, fingerprint, iris, face, retina, voice and the like. A typical biometric authentication system involves two main stages: enrollment and authentication. During enrollment, several biometric samples of a user are acquired and system registers the user by storing biometric information pertaining to the samples in the device's internal database. At the time of authentication, a biometric sample of the user is captured again and its biometric information is matched against the one stored in the database.

For instance, during fingerprint enrollment, several fingerprint images of the user are acquired; useful features are extracted and stored in the device's internal database. At the time of authentication, the user provides the fingerprint again. The system extracts features and matches them against the ones stored in the database. Although fingerprint enrollment is performed only once, it is a very crucial step as accuracy of authentication depends on the quality and completeness of enrolled samples.

Fingerprint authentication in current mobile devices is not limited to mere device unlocking but it is also used for high security applications such as mobile payments, securing sensitive information like health records, etc.

The use of embedded fingerprint sensors in mobile devices for authentication is prevalent. Typically, these sensors are miniaturized for cost and space constraints resulting in acquisition of partial fingerprints.

FIG. 1 is a schematic diagram 100 illustrating typical fingerprint sensor dimensions along with average fingerprint size according to the related art.

Referring to FIG. 1, the size of an average fingerprint 102 is about 0.5"×0.7". But, the existing mobile devices primarily use rectangular shaped touch sensors 106 of size 0.45"×0.2" or square shaped touch sensors 104 of size 0.2"×0.2" approximately for fingerprint acquisition. Clearly, the platen area of these sensors is too small to capture entire finger thus requiring complex enrollment and matching methodology.

FIGS. 2A and 2B are schematic diagrams 200 illustrating enrollment and authentication process using finger scanning in user equipment (UE) 202 according to the related art.

Referring to FIG. 2A, during enrollment process, a user scans his finger on a small scanner present on the UE 202a. As the scanner present in the UE 202a is small, therefore plurality of images is scanned for the single finger. The plurality of scanned images are then combined to obtain a single fingerprint image using any of the known image generation techniques, such as, but not limited to, image stitching, and the like. The features extracted from the plurality of images are then stored as biometric information in an internal database 204a residing in the UE 202a.

Referring to FIG. 2B, when the user wishes to access any of the services from UE 202b, then the user needs to be authenticated for accessing the service. During authentication, the same scanner from the UE 202b receives the fingerprint scan of the user's finger. Upon obtaining the fingerprint scan, the features are first extracted and compared against the features pertaining to fingerprint scans obtained during enrollment process stored in the database 204b to authenticate the user before allowing access to the services.

Solid-state fingerprint sensors present on equipment, such as, but not limited to mobile devices, tablet devices, PDA, laptop, and the like for acquiring fingerprints can be of type touch or swipe. As shown in FIG. 1, these sensors are miniaturized due to cost and space constraints which makes fingerprint enrollment and authentication on mobile devices complex procedures. In case of touch-based sensors, during enrollment, user is asked to provide multiple scans of the finger by lifting and touching the finger on the sensor in order to capture as much of finger portion possible. Although it is a one-time activity, it can be tedious and time-consuming. In case of swipe sensors, user needs to swipe finger multiple times during enrollment. Using overlapping partial scans, whole fingerprint is reconstructed using techniques like image stitching. This approach is proven to be underperforming since image stitching can be inaccurate and swiping finger on the sensor each time for authentication can be inconvenient especially for one-handed use of the mobile device.

Thus, there is a definite need for an improved method and system for faster, user-guided, and efficient biometric enrollment for mobile devices with small fingerprint sensors.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a system and method for enabling fingerprint registration on a mobile device. The method includes receiving at least one first image of a fingerprint input in a first orientation, i.e. in a horizontal position, receiving at least one second image of the fingerprint input in a second orientation which is a vertical position wherein the first orientation and the second orientation are substantially perpendicular to each other. In an embodiment of the present disclosure, the first image of the fingerprint input can be provided in a vertical orientation and the second image of the fingerprint input can be provided in a horizontal orientation.

According to an embodiment of the present disclosure, the at least one first image and the at least one second image corresponds to partial horizontal finger scans and partial vertical finger scans. In accordance with an aspect of the present disclosure, a method is provided. The method includes providing a visual indication to the user for rotating the mobile device based on an input from an orientation sensor in the mobile device.

In accordance with another aspect of the present disclosure, a method is provided. The method includes estimating a finger coverage dynamically by stitching at least one first image with at least one second image and providing a visual indication of the estimated finger coverage on the device display. Further a class of the fingerprint is determined from the captured at least one first image for matching the fingerprint hierarchically.

In accordance with another aspect of the present disclosure, a method is provided. The method includes using the fingerprint scans obtained during above-mentioned enrollment protocol for controlled authentication. The controlled authentication comprises of providing a visual guidance on a display of the mobile device to the user for placing one or more portions of the finger in one or more orientations, receiving, by the fingerprint sensor, input of one or more portions of the finger in one or more orientations, and authenticating the received one or more portions of the finger in the one or more orientations by comparing with the one or more portions of the registered fingerprint in the one or more orientations and validating the given fingerprint scan as per visual guidance provided.

Various embodiments further disclose a mobile device comprising a fingerprint registration unit configured to receive at least one first image of a fingerprint input in a horizontal orientation, receive at least one second image of the fingerprint input in a vertical orientation, an orientation sensor for providing a visual indication to the user for rotating the mobile device, a pattern generation unit configured to estimate a finger coverage dynamically by stitching at least one first image with at least one second image, provide a visual indication of the estimated finger coverage, and determine a fingerprint class from the captured at least one first image for matching the fingerprint hierarchically, and a storage unit configured to store the predicted class pattern along with fingerprint features extracted for the enrolled fingerprint.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 4A to 4C show schematic diagrams illustrating a first stage of user guided enrollment process for obtaining partial fingerprints according to an embodiment of the present disclosure;

Throughout the drawings it should be noted that like reference numbers are used to depict the same or similar elements, features, and structures.

DETAILED DESCRIPTION

Figure 1:
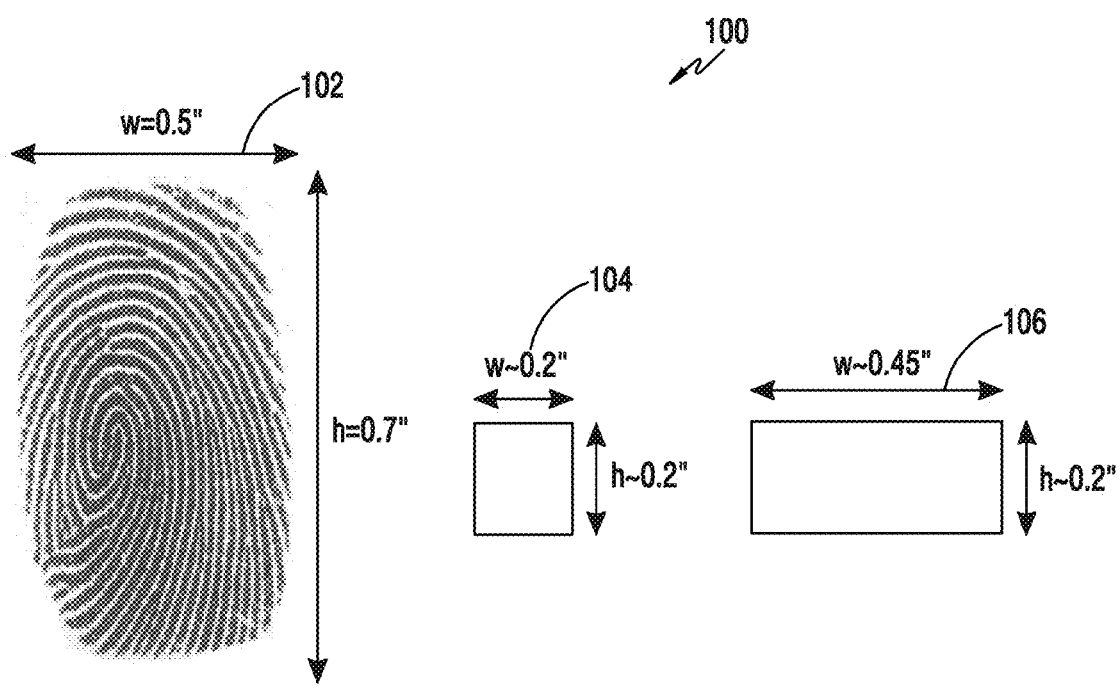
FIG. 1 is a schematic diagram illustrating fingerprint sensor dimensions embedded in mobile devices along with an average fingerprint size according to the related art.
Figure 2A:
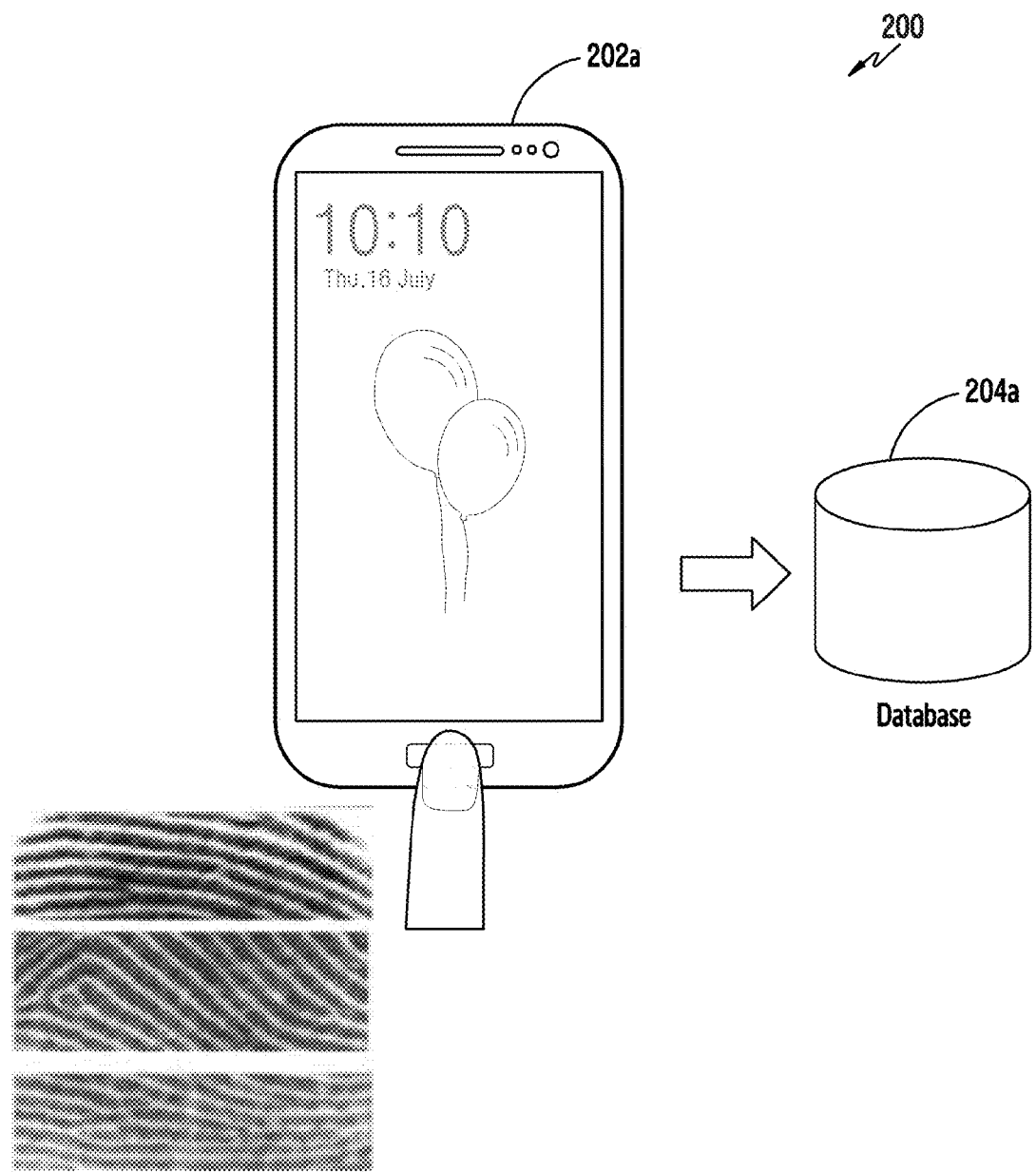
FIGS. 2A and 2B are schematic diagrams illustrating enrollment and authentication processes using fingerprint scanning according to the related art.
Figure 2B:
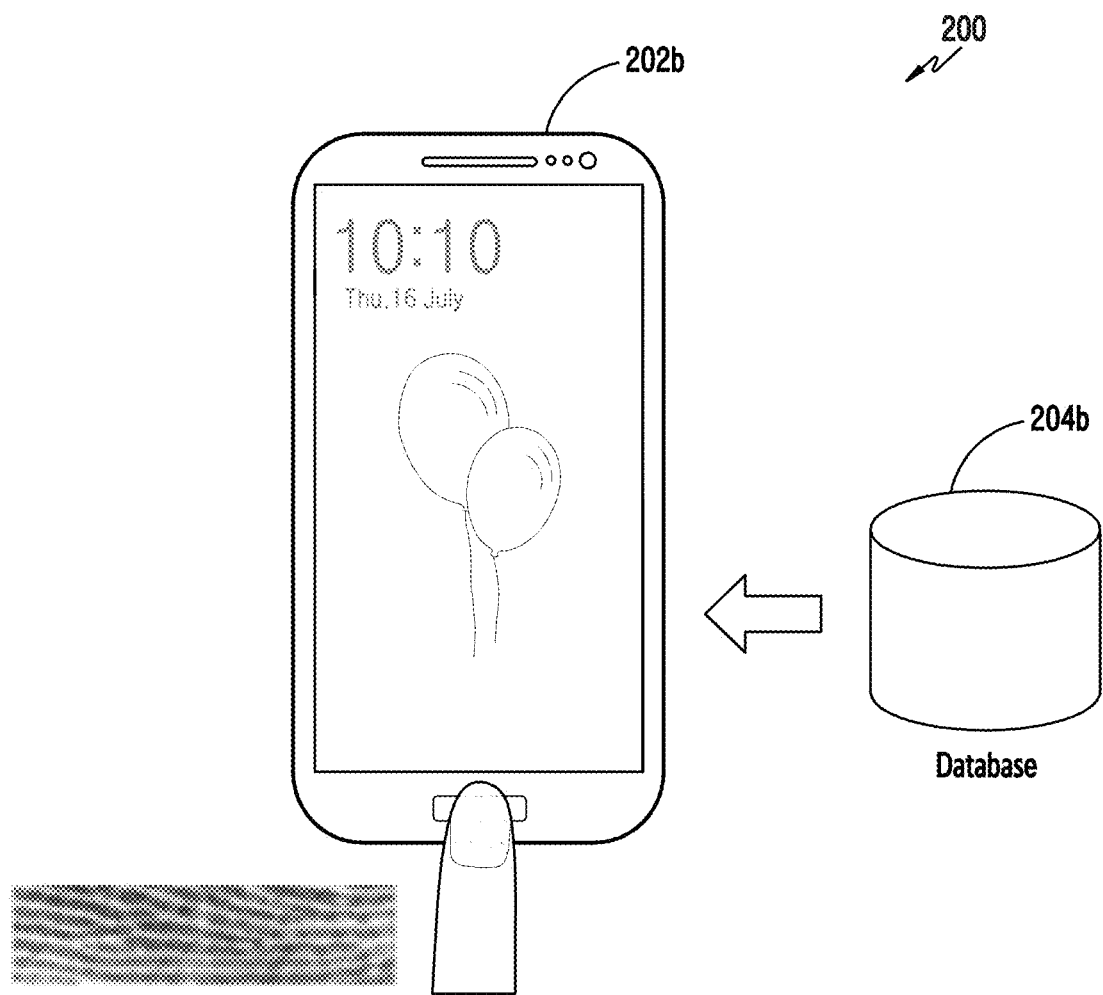

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure provides a system and method for enabling fingerprint enrollment using small size fingerprint sensors embedded on the mobile devices. In the following detailed description of the various embodiments of the present disclosure, reference is made to the accompanying drawings that form a part hereof, and in which are shown by way of illustration specific embodiments in which the disclosure may be practiced. These various embodiments are described in sufficient detail to enable those skilled in the art to practice the disclosure, and it is to be understood that other various embodiments may be utilized and that changes may be made without departing from the scope of the present disclosure. The following detailed description is, therefore, not to be taken in a limiting sense, and the scope of the present disclosure is defined only by the appended claims.

The specification may refer to "an", "one" or "some" embodiment(s) in several locations. This does not necessarily imply that each such reference is to the same embodiment(s), or that the feature only applies to a single embodiment. Single features of different various embodiments may also be combined to provide other various embodiments.

It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The various embodiments of the present disclosure, discloses a two-stage user guided enrollment protocol for mobile devices having rectangular fingerprint sensor.

The first stage of enrollment involves positioning the finger on the sensor longitudinally (along the length of finger) on the sensor. The rectangular shape of the fingerprint sensor, enables capturing of a wider finger area, thereby providing increased finger coverage within few scans.

Figure 3A:
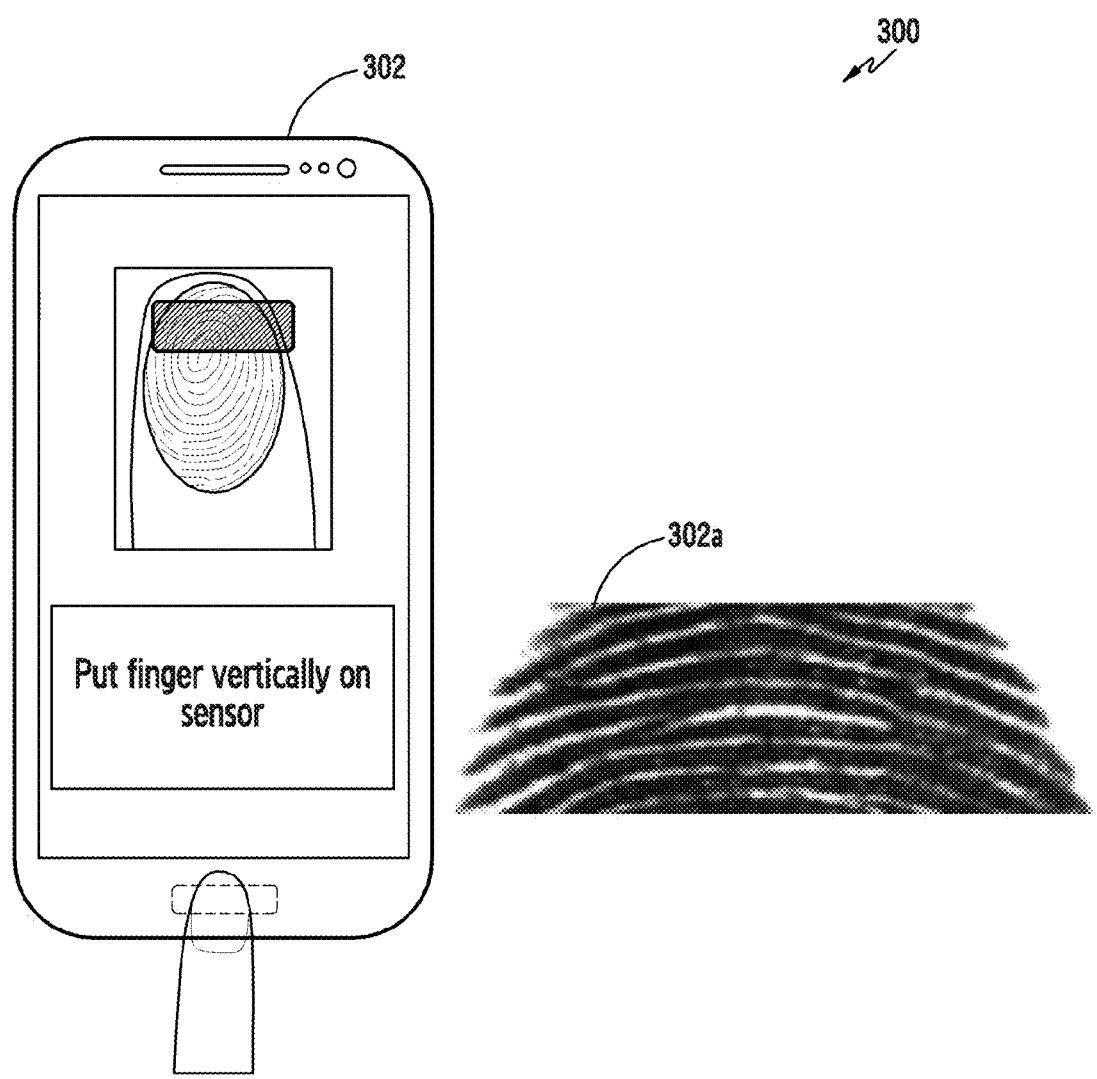
FIGS. 3A and 3B are schematic diagrams comparing a method of vertical finger scanning and horizontal finger scanning according to various embodiments of the present disclosure.
Figure 3B:
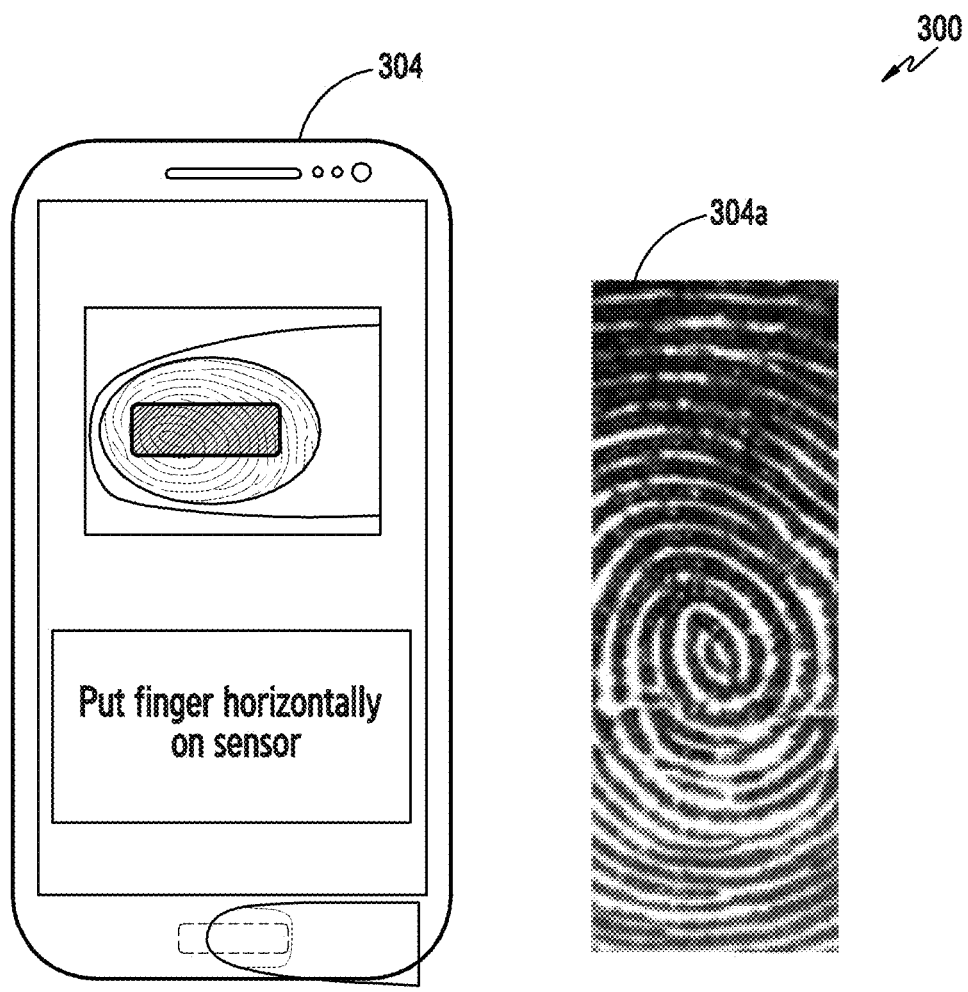

The present disclosure provides a system and method for enabling fingerprint enrollment and matching using mobile devices having small size fingerprint sensor. Enrollment protocol involves placing the fingers vertically and horizontally over the fingerprint sensor thereby acquiring global ridge portion of the finger. FIGS. 3A and 3B are a schematic diagrams comparing the conventional method of vertical finger scanning and horizontal finger scanning method disclosed by the present disclosure according to various embodiments of the present disclosure. The horizontal or longitudinal scanning of the user finger ensures that the central portion of the finger is captured in the right manner. As the central portion of the finger is rich in biometric information and has high discriminating power, it is crucial for matching. The probability of capturing global ridge pattern in horizontal scans is high as compared to vertical scans.

According to an embodiment of the present disclosure, a method for enabling fingerprint registration on a mobile device comprises of receiving at least one first image of a fingerprint input in a first orientation. The mobile device herein can be any of the electronic devices with small size fingerprint sensor including, but not limited to, mobile phones, tablets, laptops, personal digital assistant (PDA), wearables, authentication devices at various high security zones such as banks, offices, and the like.

Figure 5A:
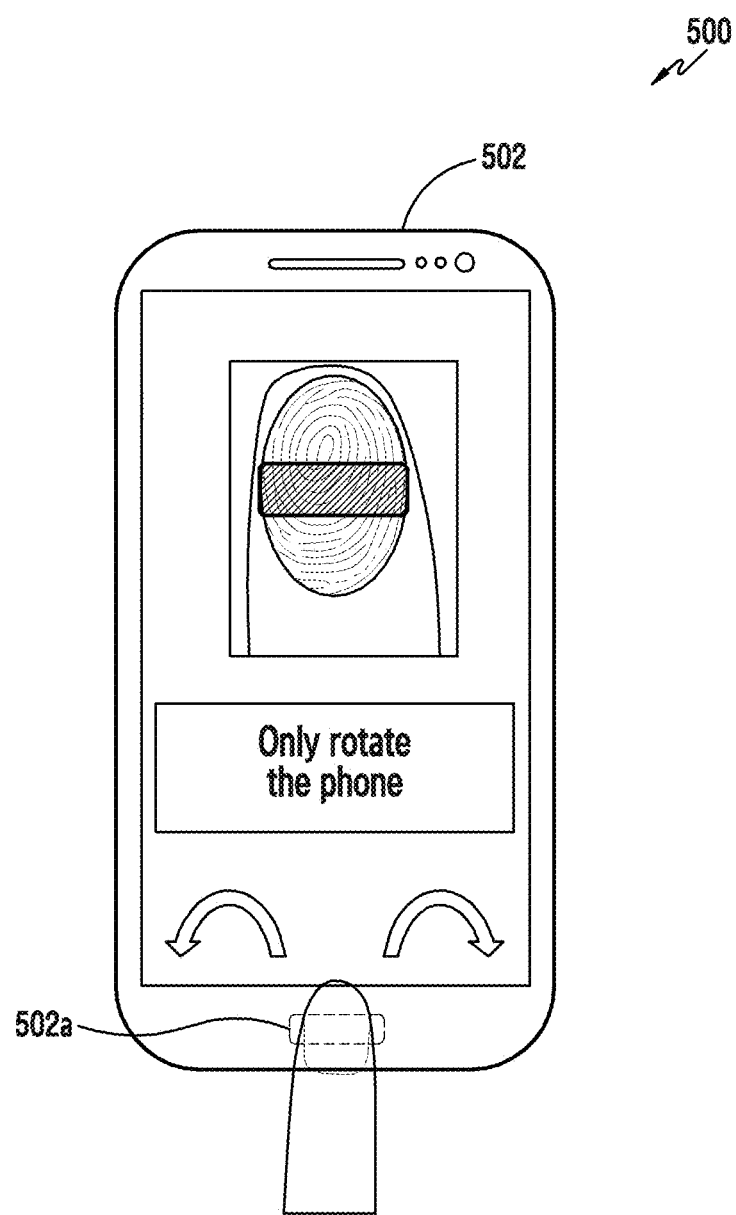
FIGS. 5A to 5C are schematic diagrams illustrating obtaining fingerprints of the user by rotating the mobile device during enrollment process according to an embodiment of the present disclosure.
Figure 5B:
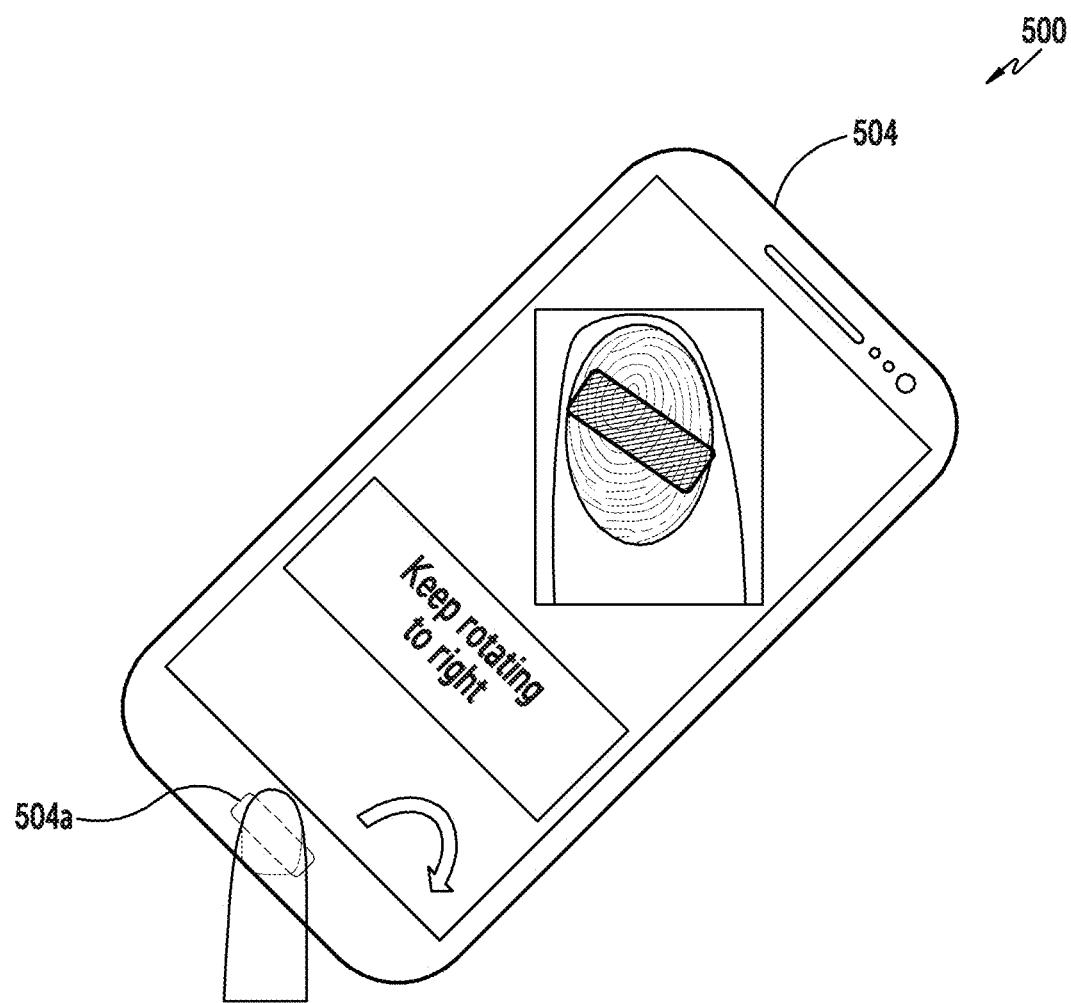
Figure 5C:
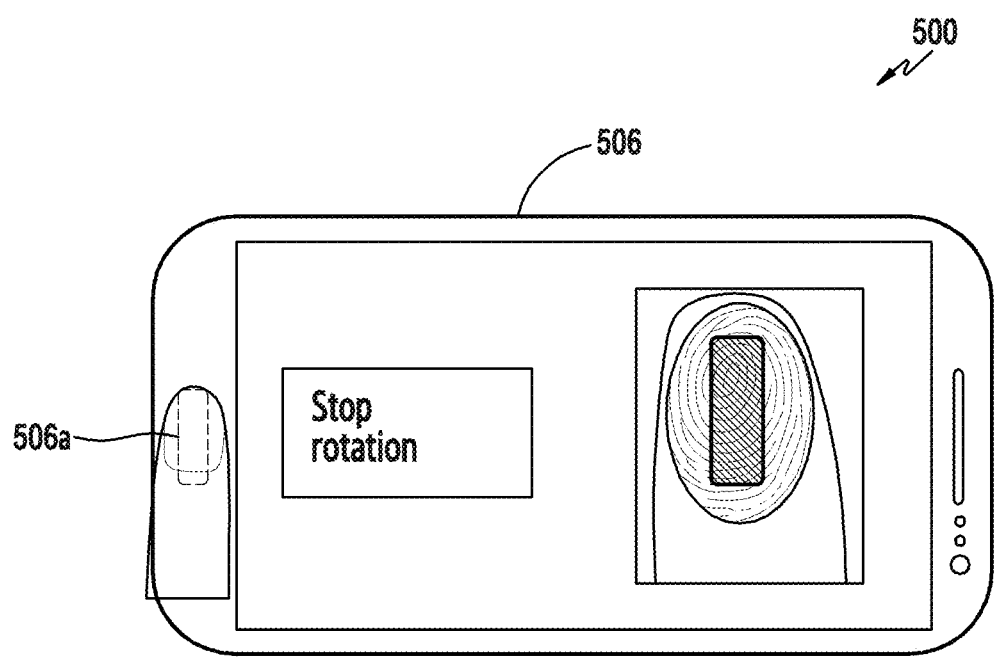

The mobile device comprises of a fingerprint enrollment unit that can receive the one or more images of the fingerprint input in the first orientation, i.e. horizontal. In an embodiment of the present disclosure, the fingerprint registration unit can be any of the known fingerprint sensors that can receive one or more first image of the fingerprint input in the first orientation. The person having ordinarily skilled in the art can understand that any of the known fingerprint sensors can be used as the fingerprint registration unit to capture one or more first images of the fingerprint input in the first orientation, without departing from the scope of the disclosure. Instead of placing finger horizontally on the fingerprint sensor as shown in FIGS. 4A to 4C, the mobile device can be rotated as well such that finger is aligned longitudinally with the fingerprint sensor as shown in FIGS. 5A to 5C.

Figures 6A, 6B, 6C:
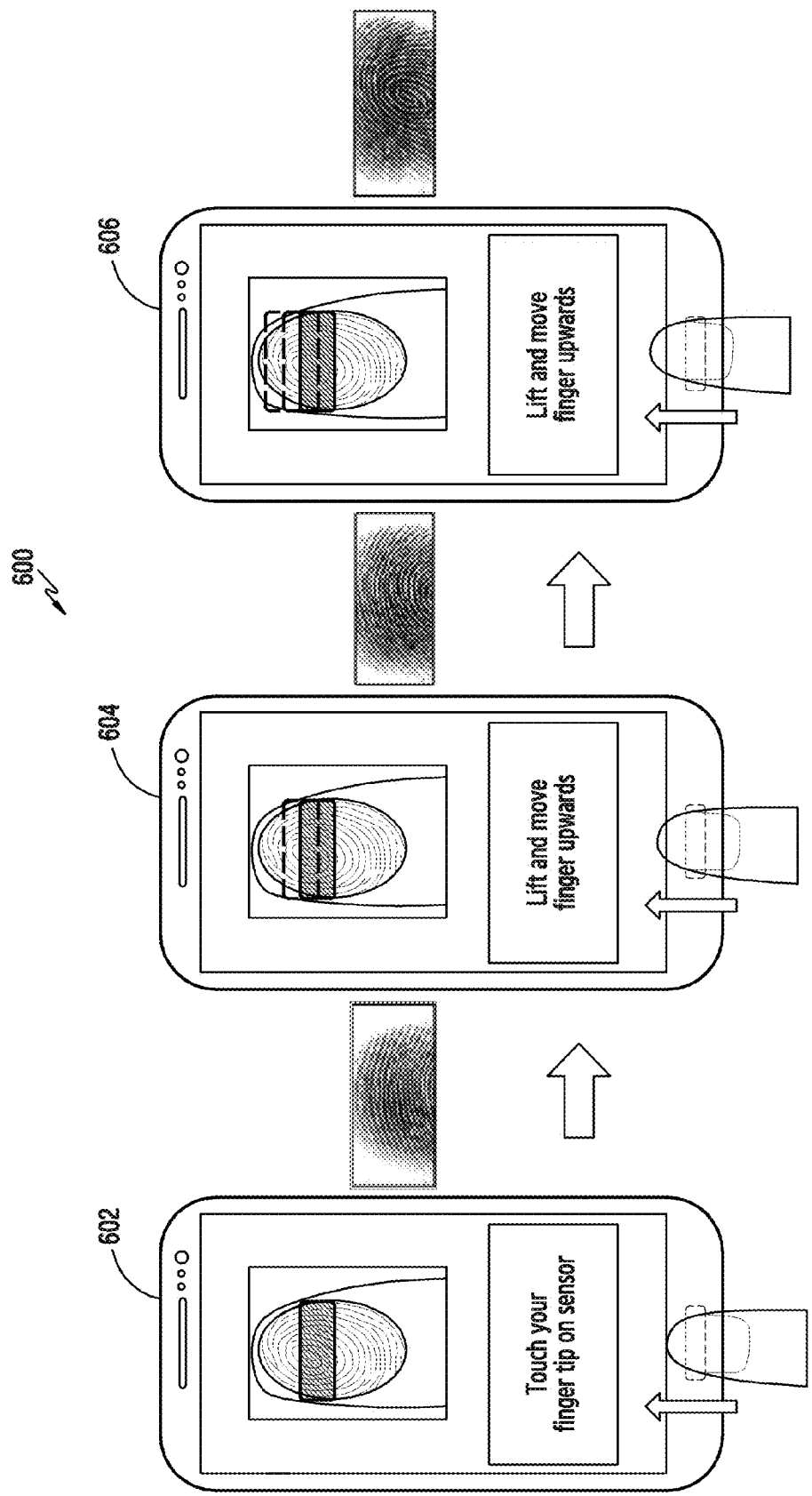
FIGS. 6A to 6C are schematic diagrams illustrating second stage of user guided enrollment process for obtaining partial fingerprints according to an embodiment of the present disclosure.

Further, the method comprises steps of receiving at least one second image of the fingerprint input in a second orientation, wherein the first orientation and the second orientation are substantially perpendicular to each other. After receiving the one or more first image of the fingerprint input in the first orientation, the fingerprint enrollment unit can receive one or more second image of the fingerprint input in a second orientation. As shown in FIGS. 6A to 6C, user is prompted to lift and move finger upwards in discrete steps in order to scan the complete finger in a vertical direction.

Further, the present disclosure also describes a controlled authentication utilizing fingerprint scans acquired using enrollment protocol for high security applications. The various embodiments and use cases disclosed in the present disclosure are merely for clear understanding of the present method and device, but not to limit the scope of the present disclosure.

In another embodiment of the present disclosure, the first orientation for obtaining one or more first image of the fingerprint input can be vertical orientation of the user's finger and the second orientation for obtaining one or more second image of the fingerprint input can be horizontal orientation of the user's finger. In another embodiment of the present disclosure, the first orientation for obtaining one or more first image of the fingerprint input can be of horizontal orientation, and the second orientation for obtaining one or more second image of the fingerprint input can be of vertical orientation. The one or more images of the finger in both first and second orientation are captured as fingerprint inputs, to cover almost all the regions of the finger. Further, the one or more captured fingerprint images are checked for quality, and one or more bad quality images are discarded or replaced with good quality by re-capturing images for secure and efficient enrollment.

Further, the method comprises of providing, by an orientation sensor, a visual indication to the user for rotating the mobile device. After acquisition of one or more first images of the finger input, and identifying that the mobile device has captured sufficient fingerprint inputs in the first orientation, the mobile device informs the orientation sensor that fingerprint inputs are to be captured in the second orientation. Based on the received information, the orientation sensor provides visual guidance to the user to begin acquiring fingerprint scans in the second orientation by changing the orientation of the mobile device.

According to an embodiment of the present disclosure, the orientation sensor can be a gyroscopic sensor. In an embodiment of the present disclosure, the visual guidance for rotating the mobile device can be a video demo on the user interface (UI) or display of the mobile device. In another embodiment of the present disclosure, the orientation sensor can also provide audio guidance along with the video guidance for obtaining fingerprint input in the second orientation, without departing from the scope of the present disclosure.

In another embodiment of the present disclosure, the orientation sensor of the mobile device can provide visual guidance to the user for providing fingerprint input in the first orientation. Upon receiving the information from the mobile device, the orientation sensor can provide visual guidance for rotating the mobile device, and further provide visual guidance for fingerprint input in the second orientation, without departing from the scope of the present disclosure.

According to an embodiment of the present disclosure, the one or more first images and the one or more second images corresponds to partial horizontal and vertical finger scans. Further, the method comprises of estimating, by a pattern generation unit, a finger coverage dynamically by stitching the at least one first image with the at least one second image. Consecutive two or more first images may not have sufficient overlap for image stitching but it is likely they have good overlap with one or many second images. Upon obtaining one or more first images of the fingerprint in the first orientation and one or more second images of the fingerprint in the second orientation, the pattern generation unit can dynamically stitch the one or more first images and the second images and identify how much portion of the finger has been covered during fingerprint scanning with both the first orientation and the second orientation. Due to aid of second images, stitching of first images can be significantly improved and vice versa. The various embodiments herein use, any of the conventional image stitching process to dynamically stitch the one or more fingerprint images to construct a final fingerprint pattern, without deviating from the scope of the disclosure.

Further, the method comprises of providing a visual indication of the estimated finger coverage. Upon stitching the one or more first images and the one or more second images, the pattern generation unit can provide the stitched image to the mobile device, wherein the mobile device can display the finger coverage obtained from stitched image on the UI of the mobile device to guide the user dynamically.

The method further comprises of determining a fingerprint class to which the captured fingerprint belongs to from the captured at least one first image for matching the fingerprint hierarchically. The method comprises the step of storing a class for a registered fingerprint. In an embodiment of the present disclosure, the storage unit for storing the information about registered fingerprint can be any of the storage unit that includes, but not limited to, internal mobile memory, external storage device, server, third party database, and the like. Further, during authentication, the stored class information can be used for hierarchical matching.

The method as disclosed herein provides for full fingerprint coverage (~100%) in fewer scans compared to existing enrollment methodologies, thereby ensuring high authentication accuracy with very low false reject rate (FRR).

The enrollment protocol involves acquiring consecutive scans of the finger thereby knowing each scan corresponds to which part of finger. System can leverage this for high security applications for providing enhanced security. The system prompts the user to provide specific part/orientation of the finger using visual guidance. The user will be authenticated only if the required part/orientation of the finger is provided.

The orientation of the finger placed can be validated by calculating the relative rotation of the verify scan with respect to the genuine best match from the enrolled gallery.

The process of enrollment and authentication of the fingerprint based on the comparison with the enrolled fingerprint are described in detail based on the following diagrams.

FIGS. 3A and 3B are schematic diagrams 300 comparing the conventional method of vertical finger scanning and horizontal finger scanning according to various embodiments of the present disclosure.

Referring to FIG. 3A, the fingerprint scanning for the enrollment of the fingerprint comprises of scanning of the user finger in a vertical orientation. During scanning of the user finger in the vertical orientation 302, the user places his finger on fingerprint scanner vertically on the fingerprint scanner in the user mobile device. In the scanning of the user finger in the vertical orientation 302, it can also be seen that, the mobile device can display video demo of how and which portion of the finger has to be placed on the fingerprint scanner so that the fingerprint image can be obtained optimally. FIG. 3A also illustrates an example of a fingerprint scan, where a scanned image 302a of a tip portion of the user finger in a vertical orientation.

According to FIG. 3B, the fingerprint scanning for the enrollment of the fingerprint comprises of scanning of the user finger in a horizontal orientation 304. The user places his finger on fingerprint scanner on the mobile device horizontally. In the scanning of the user finger in the horizontal orientation 304, it can also be seen that, the mobile device can display video demo of how and which portion of the finger has to be placed on the fingerprint scanner so that the fingerprint image can be obtained in the horizontal orientation. In an example scan 304a, it can be seen that the central ridge pattern of the finger of whorl class is captured. All the information related to the fingerprint scan is then saved in the storage unit for further authentication purposes.

FIGS. 4A to 4C are schematic diagrams 400 illustrating the first stage of user guided enrollment protocol for obtaining partial fingerprints according to an embodiment of the present disclosure.

Referring to FIGS. 4A to 4C, the various steps of receiving partial fingerprints in horizontal orientation are described. As shown in FIG. 4A, at the scanning of the user finger in the horizontal orientation 402, the mobile device provides a visual indication, with a message "lift and tap finger from left to right" for instance, along with the video of the leftmost portion of the finger being placed on the fingerprint sensor. Upon placing the finger on the fingerprint sensor horizontally, the fingerprint sensor captures the image of the finger in a horizontal direction.

Referring to FIG. 4B, at the scanning of the user finger in the horizontal orientation 404, the mobile device provides a visual indication, with a message "lift and tap finger from left to right" for instance, along with the video of the central portion of the fingertip being placed on the fingerprint sensor. The user then places the central portion of the fingertip on the fingerprint sensor as indicated by the demo video and corresponding part of the finger is captured.

Figure 13A:
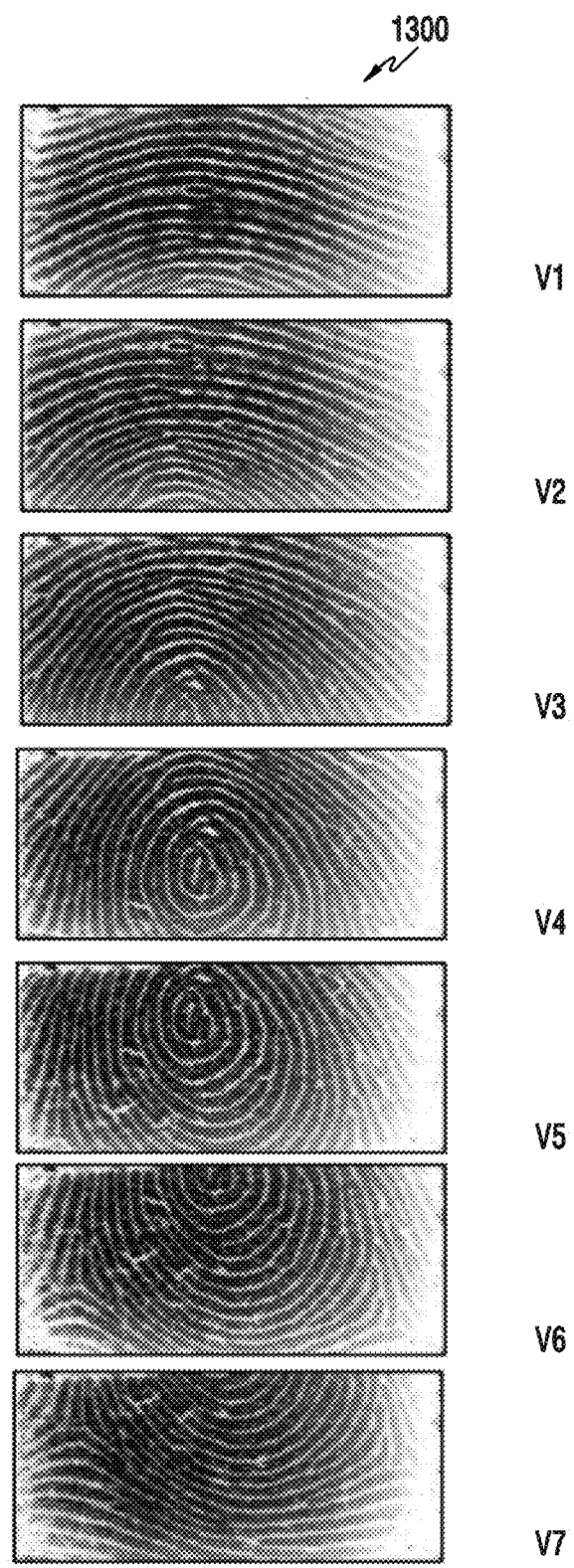
FIGS. 13A and 13B illustrate examples of horizontal and vertical partial scans acquired during stage 1 and stage 2 of the proposed enrollment process respectively.

Referring to FIG. 4C, at the scanning of the user finger in the horizontal orientation 406, the mobile device displays a video demo with a message "lift and tap finger from left to right" along with the video of the right portion of the finger being placed on the fingerprint sensor. The user also places the right peripheral portion of the finger on the fingerprint sensor exactly based on the demo video. Similarly other video demos can be shown on the display of the mobile device and based on the finger placement; a plurality of partial fingerprints can be captured in horizontal direction from the left to right direction to scan the peripheral and central portions of the finger. Since horizontal scans provide more discrete information, for improving the finger coverage, finger scanning from left to right direction is performed at two locations starting with fingertip and central portion. FIG. 13A shows the horizontal scans {H1 . . . H5} corresponding to left to right finger scanning performed in 5 steps. The number of steps can vary with the sensor dimension for optimal finger coverage.

FIGS. 5A to 5C are schematic diagrams 500 illustrating obtaining fingerprints of the user by rotating the mobile device during enrollment process according to an embodiment of the present disclosure. The user places his finger on the fingerprint sensor in a vertical orientation and the mobile device continues receiving fingerprint input for horizontal orientation as well by rotating the mobile device. According to the present disclosure, a gyroscopic sensor present in the mobile device is used to identify the orientation of mobile and guide the user to rotate the device in order to obtain the first and second image sets.

Referring to FIG. 5A, the mobile device acquires the fingerprint scan in a vertical orientation 502. Upon obtaining the fingerprint scans when the user finger is in the vertical orientation 502a, the mobile device displays video demos to rotate the mobile device either in a left direction or right direction so that fingerprint scans can be obtained in the horizontal orientation as well.

Referring to FIG. 5B, at the acquiring of the fingerprint scan at orientation 504, when the user finger is in orientation 504a, the gyroscopic sensor identifies that the mobile device is being rotated in the right direction based on the inclination and a tilt angle of the mobile device in the right direction. Upon detecting the direction and angle of tilt, the mobile device displays a video demo to keep rotating the mobile device in the right direction, for a next set of fingerprint images.

Referring to FIG. 5C, at the acquiring of the fingerprint scan at orientation 506, when the user finger is in the orientation 506a, the gyroscopic sensor identifies that the mobile has been rotated by 90 degrees in the right direction. The mobile device identifies that the user can enter fingerprints in a horizontal direction, and thus provides an indication to stop rotation of the mobile device. The indication can be a video demo played on the mobile device to indicate for stopping the rotation of the mobile device. Upon stopping the rotation, the fingerprint sensor can initiate capturing fingerprint images/scans in the horizontal direction. In another embodiment of the present disclosure, the mobile device can be held constant and the finger of the user can be rotated over the fingerprint sensor, such that fingerprint scans can be acquired in the horizontal orientation.

FIGS. 6A to 6C are schematic diagrams 600 illustrating second stage of user guided enrollment process for obtaining partial fingerprints according to another embodiment of the present disclosure.

Referring to FIGS. 6A to 6C, examples of one or more video demos showing the user how to capture the plurality of fingerprints in a vertical orientation of the user finger is described herein. As shown in FIG. 6A, at the scanning of the user finger in the vertical orientation 602, the mobile device displays a video demo with message "touch your finger tip on sensor". The visual indication, can be, for instance a video of the fingertip being placed on the fingerprint sensor. Based on the guidance provided by demo the user places the fingertip on the fingerprint sensor and the corresponding fingerprint image is captured.

Figure 13B:
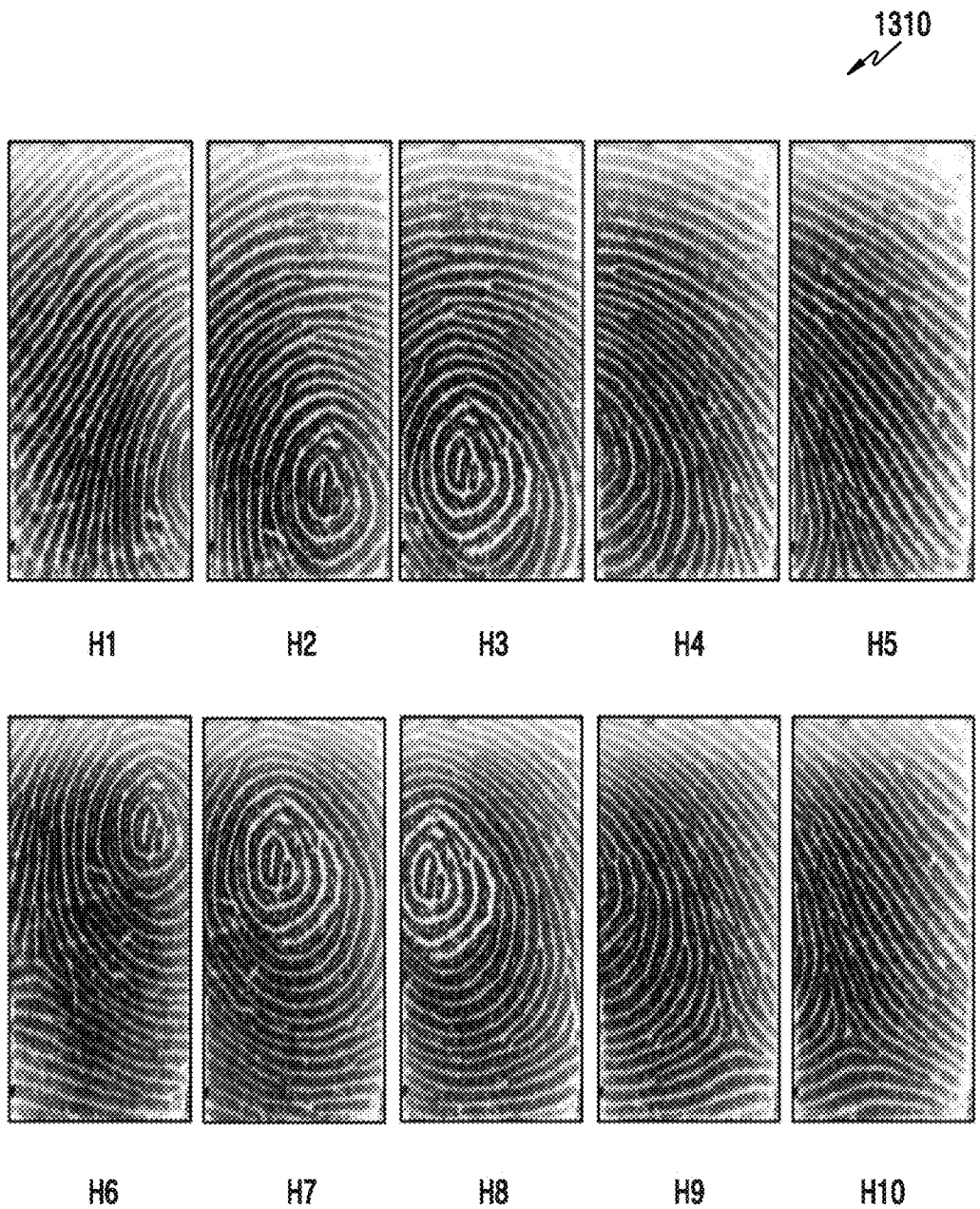

As shown by FIG. 6B, at the scanning of the user finger in the vertical orientation 604, the mobile device provides a visual indication, with a message "lift and move the finger upwards" for instance, along with the video of the lower portion of the fingertip being placed on the fingerprint sensor. The user then places the lower portion of the fingertip on the fingerprint sensor as indicated by the demo video and corresponding part of the finger is captured. As shown by FIG. 6C, at the scanning of the user finger in the horizontal orientation 606, the mobile device displays a video demo with a message "lift and move the finger upwards" along with the video of the middle portion of the finger being placed on the fingerprint sensor. The user also places the middle portion of the finger on the fingerprint sensor exactly based on the demo video. Similarly other video demos can be shown on the display of the mobile device and based on the finger placement; a plurality of partial fingerprints can be captured. As shown in FIG. 6C, user is prompted to lift and move finger upwards in few discrete steps in order to scan complete finger vertically. FIG. 13B shows examples of partial vertical scans {V1 . . . V5} obtained by scanning finger vertically starting with fingertip in 5 steps. The number of steps can vary with the sensor dimension for optimal finger coverage.

Figure 7A:
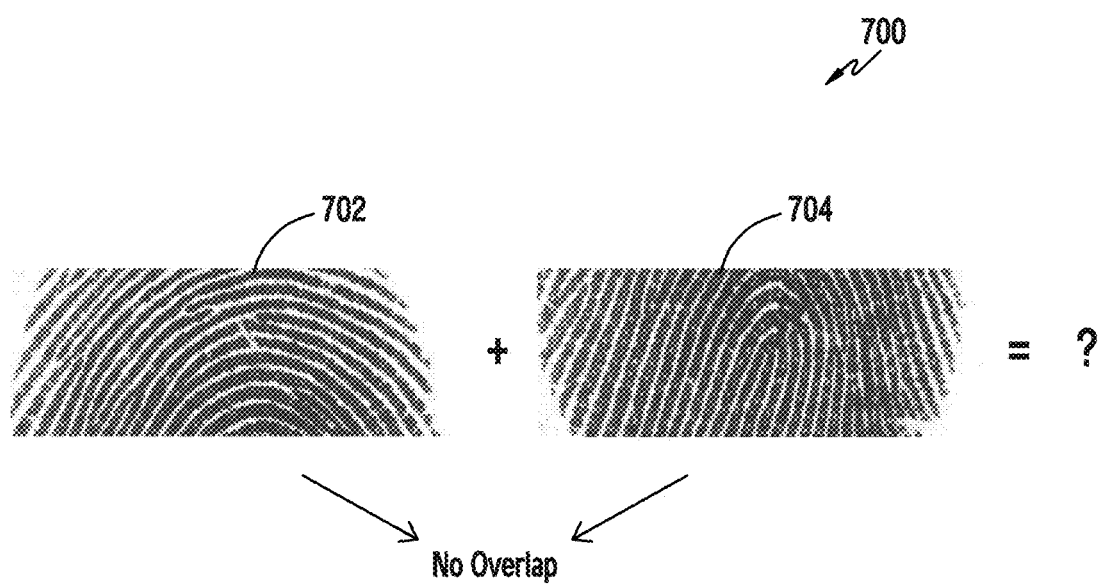
FIGS. 7A and 7B are schematic diagrams illustrating generating a fingerprint pattern using an image stitching of pre-scanned fingerprints according to an embodiment of the present disclosure.
Figure 7B:
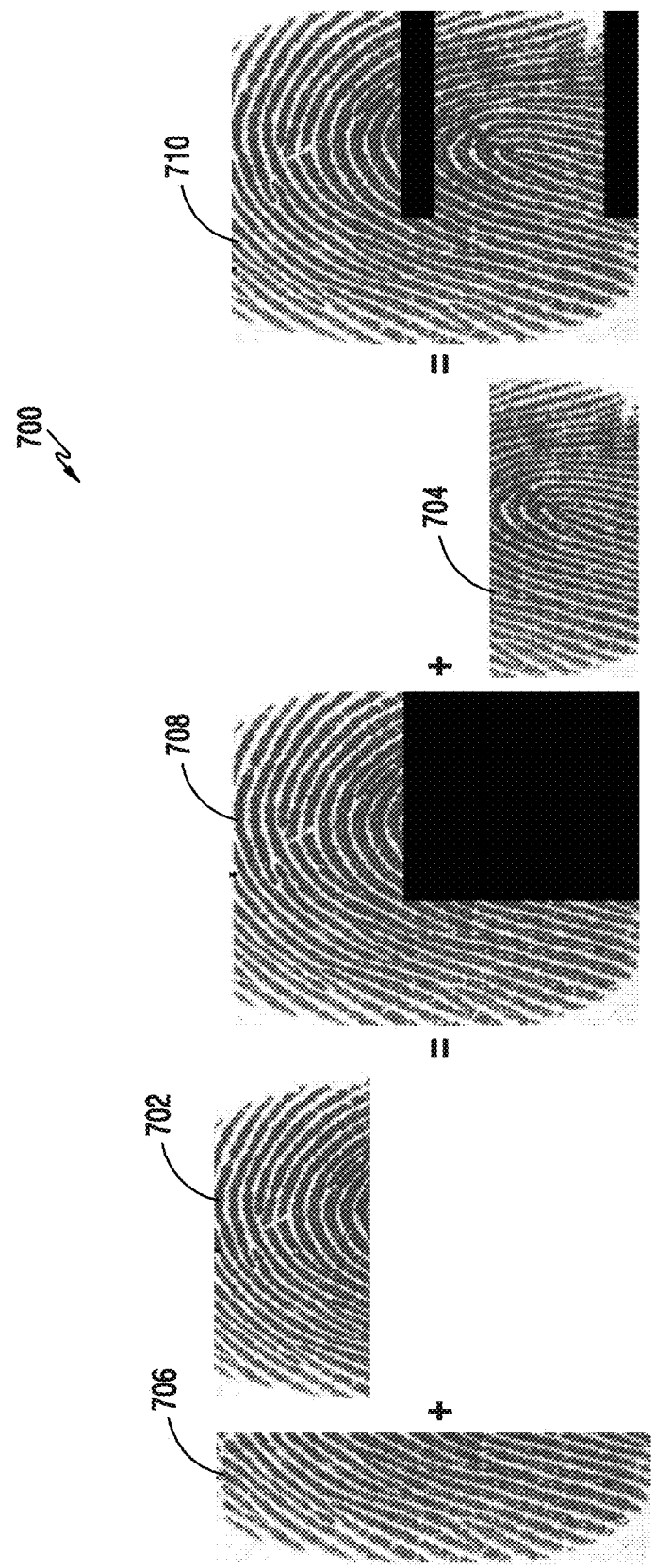

FIGS. 7A and 7B are schematic diagrams 700 illustrating generating a fingerprint pattern using an image stitching of pre-scanned fingerprints according to an embodiment of the present disclosure. A plurality of both vertically scanned images and horizontally scanned images can be taken, which are then stitched together using an image stitching method, to obtain a complete image corresponding to the fingerprint scan of the user.

Referring to FIG. 7A, two vertical scanned images, namely partial vertical scan 1 (image 702) and partial vertical scan 2 (image 704) are considered for image stitching. However, these images 702 and 704 do not have sufficient overlap for enabling image stitching. Consecutively, as illustrated in FIG. 7B, one partial horizontal scan 1 image 706 and one partial vertical scan 1 image 702, obtained during fingerprint scanning in horizontal and vertical direction can be considered for image stitching. Two or more consecutive vertical images may not have sufficient overlap for image stitching but it is likely that they have sufficient overlap with one or many horizontal images. Due to the aid of horizontal images, stitching of vertical images can be significantly improved and vice versa.

First, the partial horizontal scan 1 706 and the partial vertical scan 1 702 can be stitched together to obtain a stitched image 1 708. Further, the stitched image 1 708 is stitched with the partial vertical scan 2 704 to obtain the stitched image 2 710.

Referring to FIG. 7B, the stitched image 2 710 has a larger finger portion containing richer biometric information useful for matching the fingerprint. According to the present disclosure, any of the known stitching processes can be used for stitching the plurality of partial scans to form the fingerprint image, without departing from the scope of the disclosure.

Figure 8:
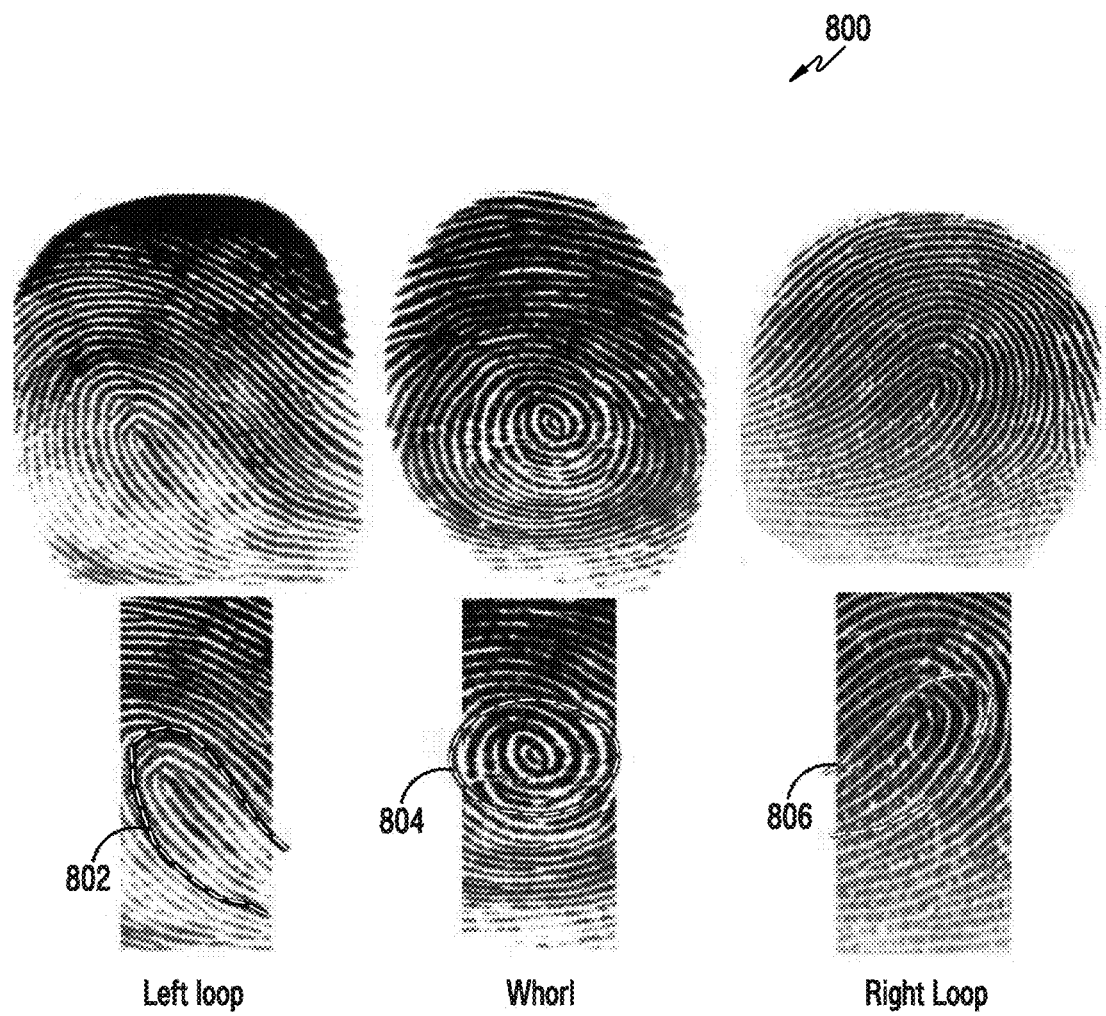
FIG. 8 is a schematic diagram illustrating predicting the class of partial fingerprint using curve fitting according to an embodiment of the present disclosure.

FIG. 8 is a schematic diagram 800 illustrating predicting class of the partial fingerprint using curve fitting according to an embodiment of the present disclosure.

Referring to the schematic diagram 800, the class of the fingerprint can be identified using partial horizontal scans. As the central ridge pattern of the finger is captured during horizontal scanning of the fingerprint, the curve-fitting like approaches can be used to predict the class of the fingerprint using the orientation map of underlying ridge flow. The information about the class of the fingerprint can be used in hierarchical matching. According to the present disclosure, the classes of the fingerprint can be at least one of, but not limited to, left loop, whorl, right loop and the like.

Further, FIG. 8 illustrates pre-defined kernels for left loop 802, whorl 804 and right loop 806 of the user finger. Whenever horizontal partial fingerprint scans of the user are obtained, these three pre-defined kernels are fitted in the ridge orientation maps of the fingerprint scans using known kernel fitting techniques such as, but not limited to, on the ridge orientation maps and the like. Based on the response of kernel fitting, the fingerprint is classified into one of Left loop, Right loop or Whorl class. If none of the kernels fit well, the fingerprint class is categorized "unknown".

According to the present disclosure, the fingerprint enrollment method and authentication system herein is used for various applications such as, but not limited to, conducting financial transactions, sharing confidential documents, defense applications, and the like which require secure authentication. The present disclosure of fingerprint enrollment method and matching ensures better finger coverage in fewer scans compared to existing enrollment methodologies, and thereby ensuring higher authentication accuracy with very low FRR.

Figure 9:
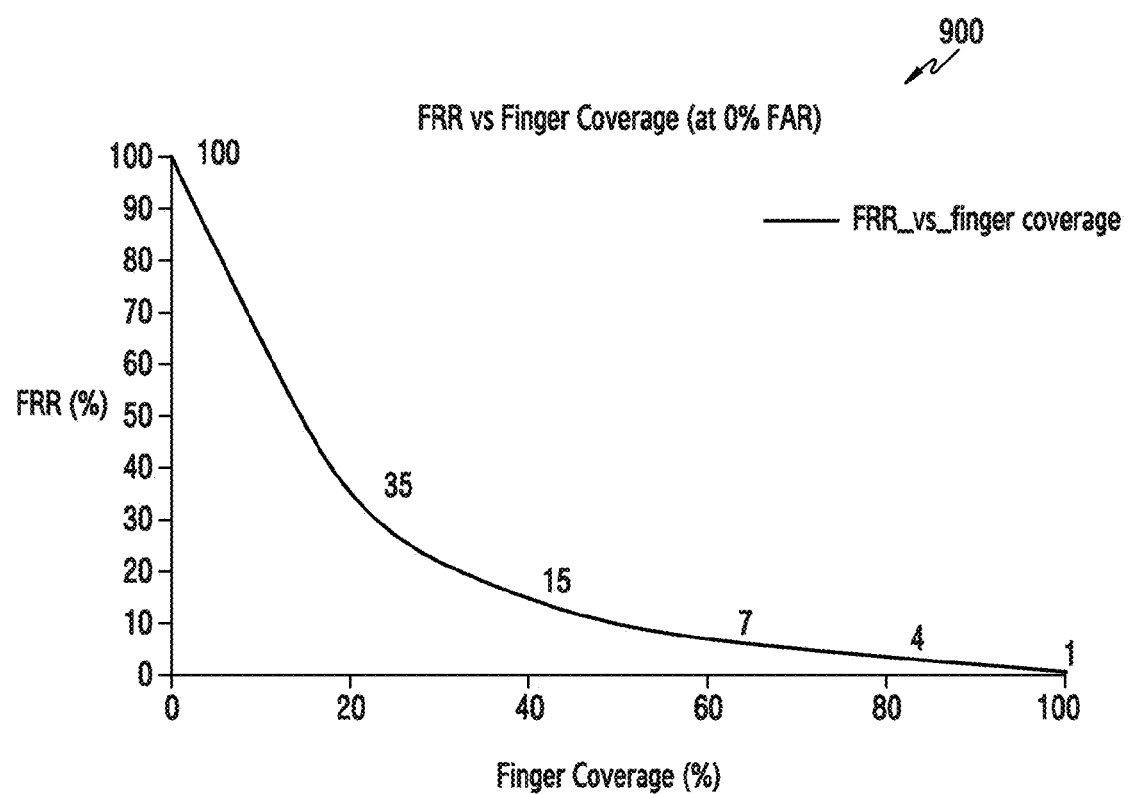
FIG. 9 is a graphical representation of false reject rate (FRR) against finger coverage at 0% false accept rate (FAR) according to an embodiment of the present disclosure.

FIG. 9 is a graphical representation 900 of FRR against finger coverage at 0% false accept rate (FAR) according to an embodiment of the present disclosure.

Referring to FIG. 9, the graph 900 is obtained by plotting finger coverage against FRR at 0% FAR. FRR indicates the rate at which the fingerprint authentication mechanism of the mobile can reject the fingerprint of the already enrolled user based on the obtained fingerprint. The graph 900 clearly shows that as the finger coverage is less, the chance of getting false rejects is higher. FAR indicates the rate at which the fingerprint authentication mechanism of the mobile can falsely accept unregistered finger as genuine.

Further, the present disclosure can be used in controlled authentication for high-security applications. The present disclosure enables acquiring consecutive scans of the finger, thereby knowing which scan corresponds to which part of finger. Further the user can be prompted to give specific part/orientation of the finger at the time of authentication by utilizing the mapping facilitated by the proposed enrollment protocol. The user can be provided with a visual demo depicting how to place the finger on the fingerprint sensor. Upon receiving the fingerprint scan, the user can be authenticated if and only if the required part/orientation of the finger is provided. The required part of the placed finger can be validated by finding which scan out of the enrollment scans the verify scan matches best. For example, the tip of the finger should match best with the first scan obtained during vertical scanning. The controlled authentication can also be performed based on the orientation of the finger. The required orientation of the finger placed can also be validated by calculating the relative rotation of the fingerprint scan with respect to the best match from the enrolled database.

According to the present disclosure, during authentication of the user, the mobile device necessitates the user to provide specific part of the finger in a particular orientation using visual guidance. Then, user will be authenticated only if the required part of the finger is provided in the particular orientation, which matches with the enrolled fingerprint of the user.

In total, the fingerprint of the user obtained comprises of a plurality of partial fingerprints which can be a part of the tip of the finger, middle of the finger and the bottom of the finger. During controlled authentication, the mobile device asks for one or more portions of the finger or one or more portions of the finger in one or more particular orientations. The mobile device shows the video demo on the display unit indicating which portion of the finger is to be positioned on the fingerprint sensor for scanning and in what particular orientation. Based on the displayed video demo, the user can place the particular portion of the finger in the particular direction. The fingerprint sensor can capture the scan of one or more portions of the fingers in the one or more particular orientations. Upon providing the particular portion of the finger or particular portion of the finger in the particular orientation, the mobile device can match the fingerprint with the enrolled fingerprint for authenticating the user and validate if user placed in the finger in right manner as indicated in video demo.

Figure 10:
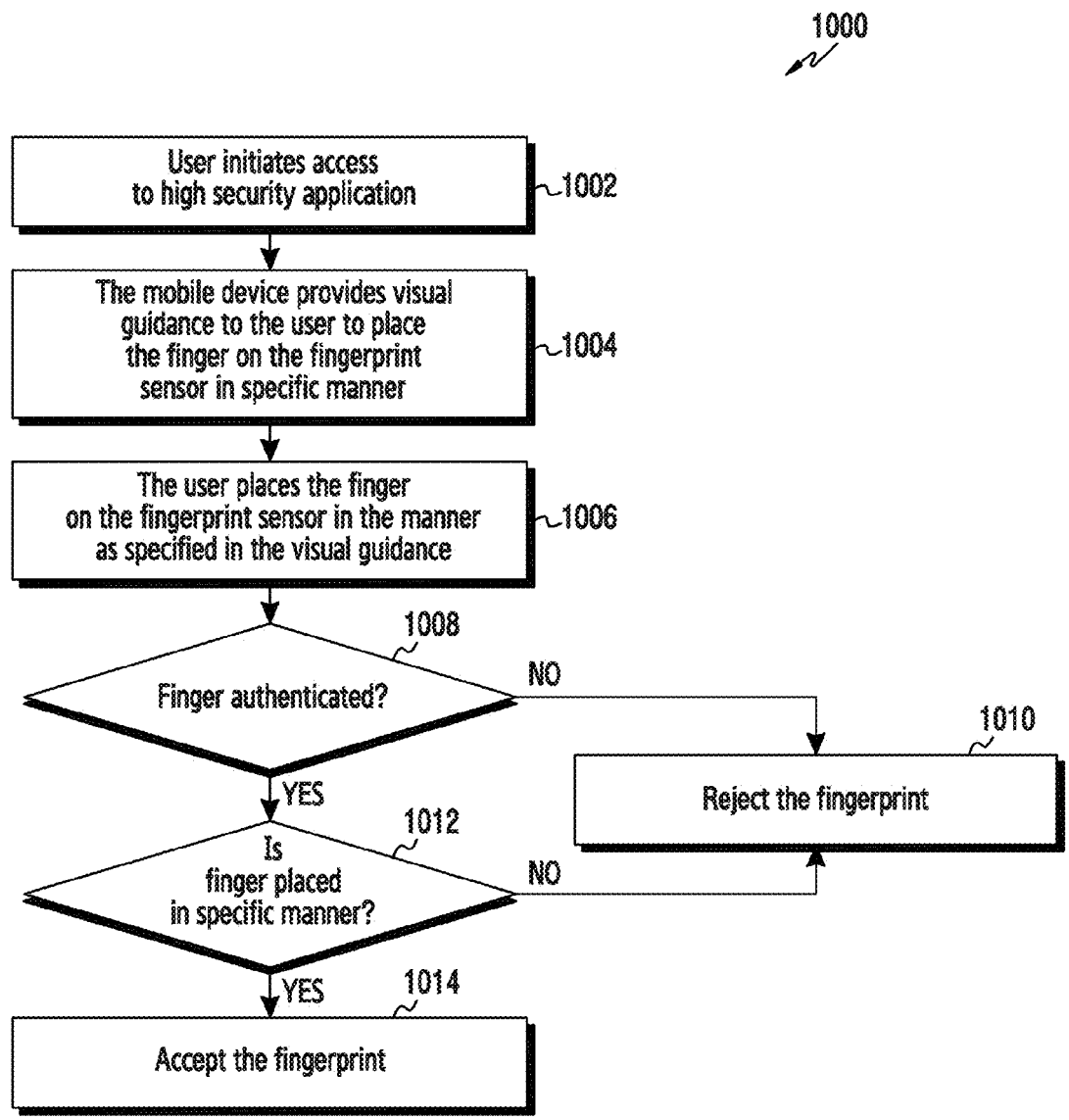
FIG. 10 is a schematic flow diagram illustrating a method of controlled authentication of the user through fingerprint scanning according to an embodiment of the present disclosure.

FIG. 10 is a schematic flow diagram 1000 illustrating a method of controlled authentication according to an embodiment of the present disclosure. The user is already enrolled for the biometric authentication by providing his/her fingerprints, where the extracted features are saved in the storage unit. The person having ordinarily skilled in the art can understand that the user has already been enrolled with the mobile device using the fingerprint based enrollment method as described herein above and thus not described herein again to avoid repetition.

Referring to the flow diagram 1000 of FIG. 10, at operation 1002, user initiates accessing a high security application. In an embodiment of the present disclosure, the initiation of the high security application can refer to, but not limited to, launching of the application, logging into the application, and the like, without departing from the scope of the disclosure. At operation 1004, the mobile device provides visual guidance to the user to place the finger on the fingerprint sensor in specific manner. The specific manner can refer to placing of the particular portion of the finger on the fingerprint sensor in a particular orientation.

At operation 1006, the user places the finger on the fingerprint sensor in the manner as specified in the visual guidance. The fingerprint sensor receives the fingerprints of the user in the specified manner. At operation 1008, the mobile device authenticates the fingerprint of the user for accessing the high security application, wherein the mobile device compares whether the received fingerprint matches with one of the enrolled fingerprints stored in the database or not. If the fingerprints do not match, then at operation 1010, the mobile device rejects the user's access to the high security application. In an embodiment of the present disclosure, upon rejecting the fingerprint, mobile device can perform various actions, such as but not limited to, providing predetermined number of attempts to provide correct fingerprint scan, requesting for security question, reporting to the security administrator about breach/attempt of access by un-authorized person, and the like.

If received fingerprint matches with one of the enrolled fingerprints, then at operation 1012, the mobile device further checks whether the fingerprint is obtained in the same manner as the fingerprint specified and displayed on the visual guidance. If fingerprint is obtained in the specified manner, the mobile device accepts the fingerprint, at operation 1014, and provides access to the high security application based on controlled authentication. If the fingerprint is not inputted in the specified manner, then at operation 1010 the mobile device rejects the access to the high security application, and can take any of the herein above mentioned action, without departing from the scope of the disclosure.

Figure 11A:
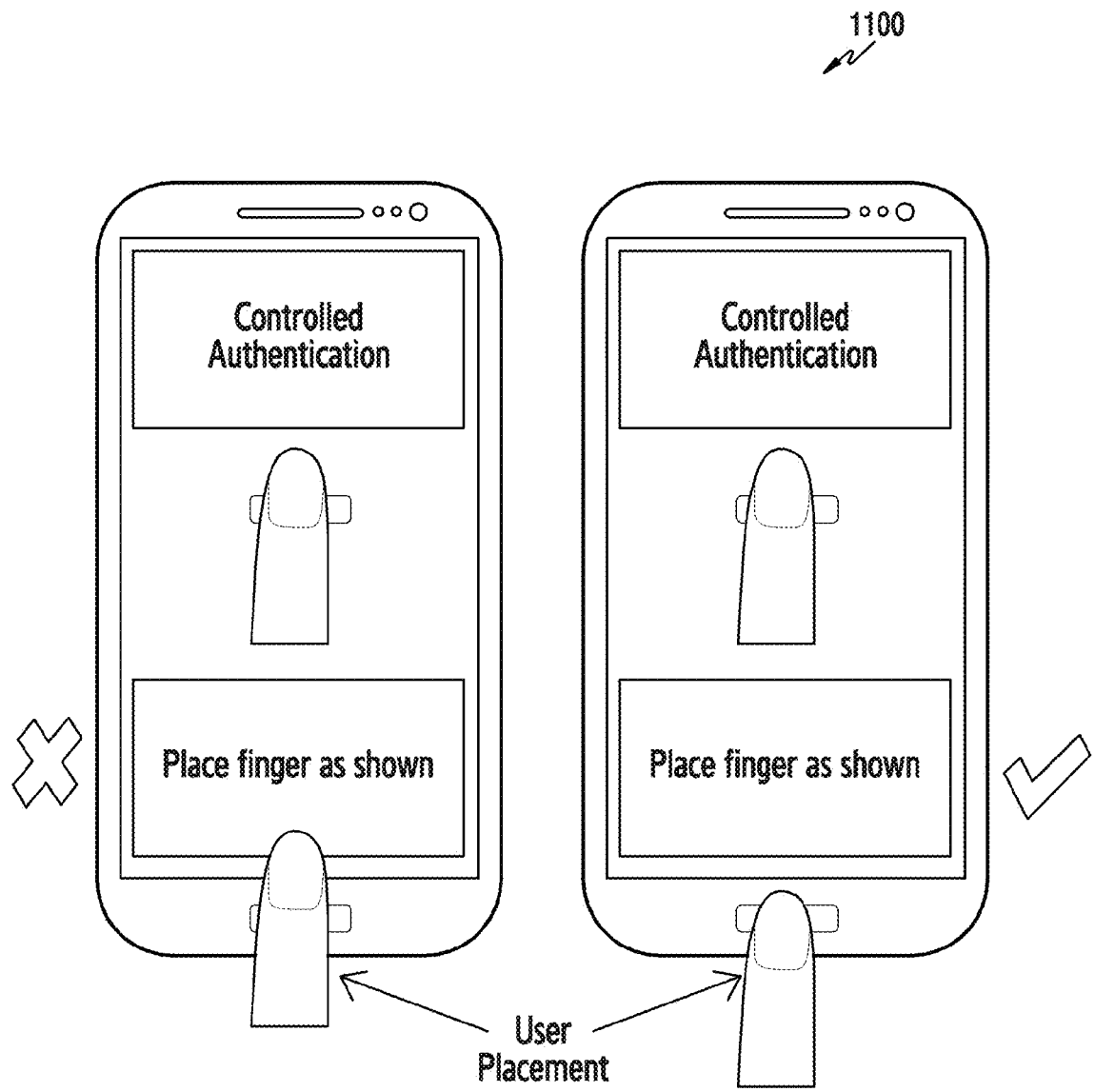
FIGS. 11A and 11B are schematic diagrams illustrating controlled authentication of the user through fingerprint scanning according to an embodiment of the present disclosure.
Figure 11B:
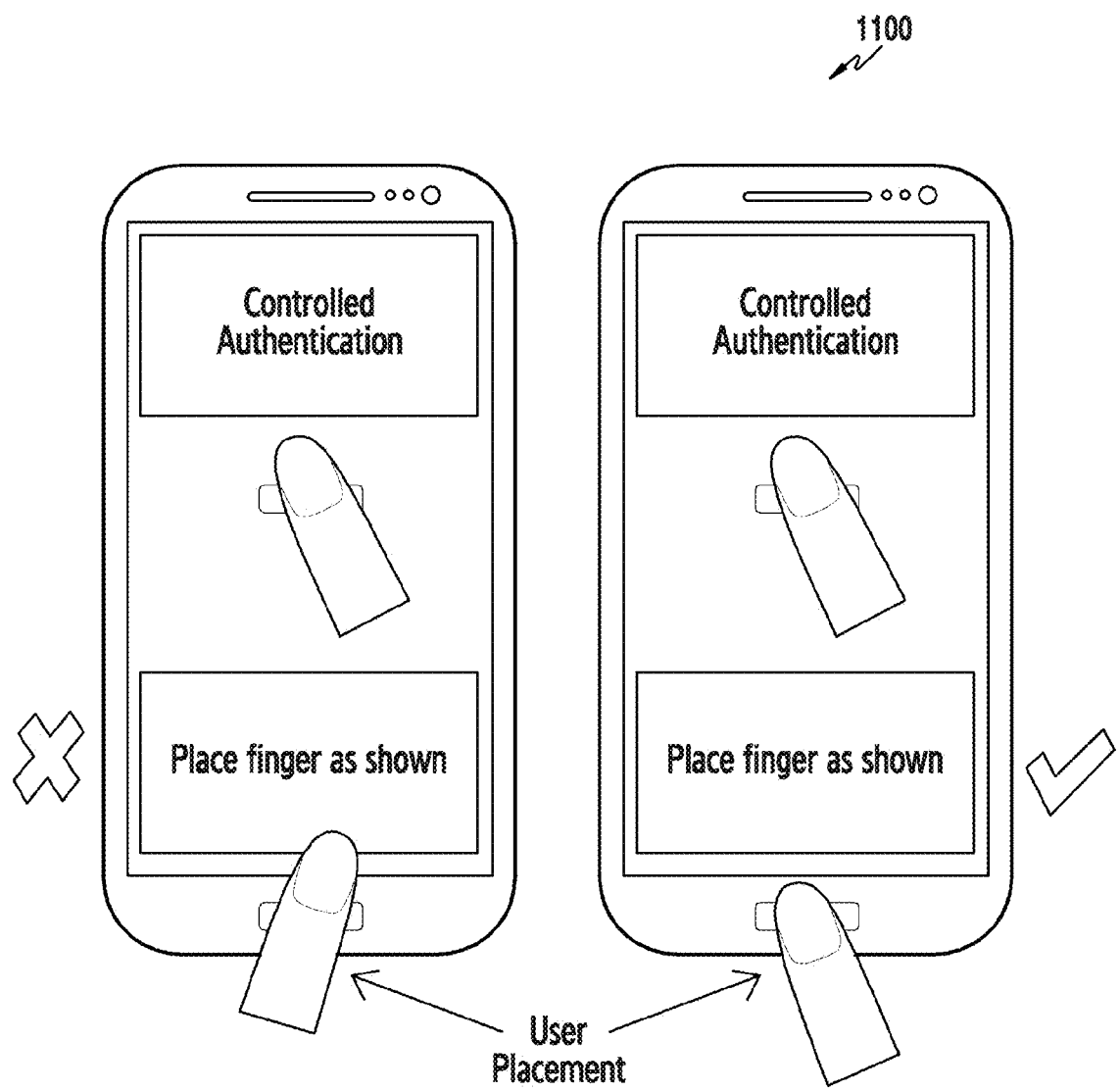

FIGS. 11A and 11B are schematic diagrams illustrating controlled authentication of the user via fingerprint scanning according to an embodiment of the present disclosure. FIG. 11A is a schematic diagram 1100 illustrating controlled authentication of the user based on matching a specific portion of the finger with the enrolled specific portion of the user. According to the schematic diagram 1100, the user is asked to place the specific portion of the finger on the fingerprint sensor for authentication. For example, the user is asked to place the tip or middle portion of the finger on the fingerprint sensor, and the like.

FIG. 11B is a schematic diagram 1110 illustrating controlled authentication of the user based on matching specific portion of the finger in a particular orientation with the enrolled specific finger portion of the user. According to the diagram 1110, the user is asked to place the specific portion of the finger on the fingerprint sensor in a particular orientation for authentication. The orientation of the finger placed can be validated by calculating the relative rotation of the fingerprint scan with respect to the genuine best match from the enrolled database.

Figure 12:
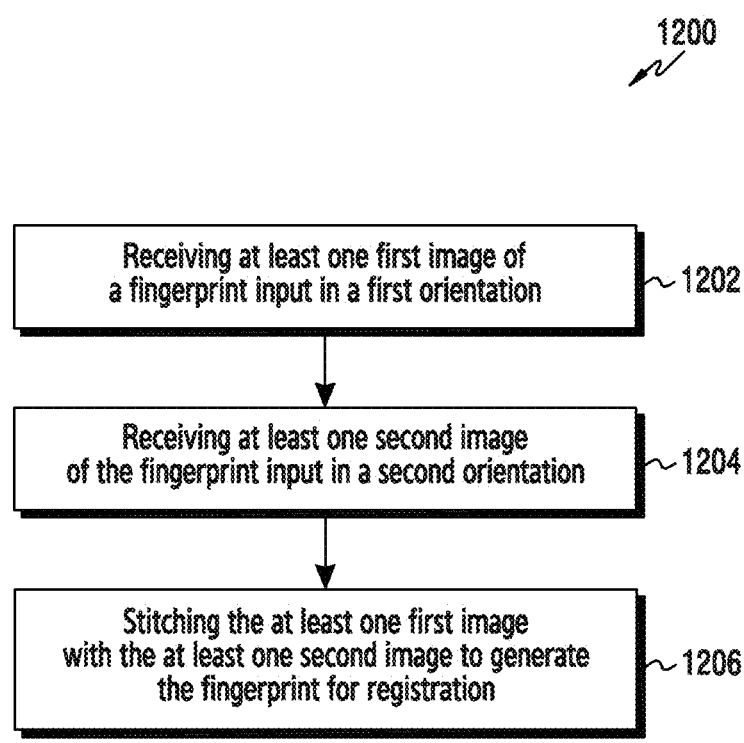
FIG. 12 is a schematic flow diagram 1200 illustrating a method for enabling fingerprint registration on a mobile device according to an embodiment of the present disclosure.

FIG. 12 is a schematic flow diagram 1200 illustrating a method for enabling fingerprint registration on a mobile device according to an embodiment of the present disclosure.

Referring to the flow diagram 1200 of FIG. 12, at operation 1202, the method comprises receiving at least one first image of a fingerprint input in a first orientation. According to the present disclosure, first image of the fingerprint input can be received in the first orientation by a fingerprint registration unit of an electronic device as described herein above, and thus not repeated herein again to avoid repetition.

Further, at operation 1204, the method comprises a step of receiving at least one second image of the fingerprint input in a second orientation. In an embodiment of the present disclosure, the first orientation and second orientation of the fingerprint input can be interchanged, without departing from the scope of the disclosure. Further, at operation 1206, the method further comprises a step of stitching at least one first image with at least one second image to generate the fingerprint for registration, wherein the first orientation and the second orientation are substantially perpendicular to each other.

FIGS. 13A and 13B are schematic diagrams 1300 and 1310 illustrating fingerprint scans obtained in vertical and horizontal orientations respectively according to an embodiment of the present disclosure.

Referring to FIG. 13A, the schematic diagram 1300 illustrates plurality of fingerprints $\{V_1, \ldots, V_7\}$ taken while the finger of the user is placed on the fingerprint sensor in vertical orientation. Further, FIG. 13B, the schematic diagram 1310 illustrates plurality of fingerprints $\{H_1, \ldots, H_{10}\}$ taken while the finger of the user is placed on the fingerprint sensor in horizontal orientation.

The present various embodiments have been described with reference to specific example embodiments; it will be evident that various modifications and changes may be made to these various embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for enabling a fingerprint registration on a mobile device, the method comprising:
displaying a visual guidance for guiding how to perform a first fingerprint input;
receiving at least one first image of the first fingerprint input;
detecting a first orientation of the first fingerprint input;
displaying another visual guidance for guiding to perform a second fingerprint input in a second orientation different from the detected first orientation;
receiving at least one second image of the second fingerprint input in the second orientation;
generating a fingerprint image by stitching the at least one first image with the at least one second image; and
performing authentication for a user of the mobile device based on the fingerprint image.

2. The method of claim 1, further comprising:
estimating a finger coverage from the generated fingerprint image; and
displaying another visual guidance with a message for guiding to perform the fingerprint input by moving a finger in a predetermined direction based on the estimated finger coverage.

3. The method of claim 1, further comprising determining a fingerprint class from the received at least one first image for matching the fingerprint hierarchically.

4. The method of claim 3, wherein the fingerprint class is at least one of left loop, whorl, and right loop.

5. The method of claim 1, wherein the at least one first image and the at least one second image correspond to partial horizontal finger scans and partial vertical finger scans, respectively.

6. The method of claim 1,
wherein the displaying of the visual guidance comprises displaying the visual guidance for guiding to place one or more portions of a finger in one or more orientations,
wherein the receiving of the at least one first image comprises receiving, by a fingerprint sensor, the first fingerprint input of one or more portions of the finger in the first orientation,
wherein the receiving of the at least one second image comprises receiving, by the fingerprint sensor, the second fingerprint input of one or more portions of the finger in the second orientation, and wherein the performing of the authentication comprises authenticating a third fingerprint input of at least one portion of a finger of the user by comparing with the generated fingerprint image in at least one orientation.

7. A mobile device for enabling a fingerprint registration, the mobile device comprising:
a display;
a memory configured to store computer-readable instructions; and
a processor configured to execute the computer-readable instructions, which when executed cause the processor to:
control the display to display a visual guidance for guiding how to perform a first fingerprint input,
receive at least one first image of the first fingerprint input,
detect a first orientation of the first finger print input,
control the display to display another visual guidance for guiding to perform a second fingerprint input in a second orientation different from the detected first orientation,
receive at least one second image of the second fingerprint input in the second orientation,
generate a fingerprint image by stitching the at least one first image with the at least one second image, and
perform authentication for a user of the mobile device based on the fingerprint image.

8. The mobile device of claim 7,
wherein the processor is further configured to estimate a finger coverage from the generated fingerprint image, and
wherein the display is configured to display another visual guidance with a message for guiding to perform the fingerprint input by moving a finger in a predetermined direction based on the estimated finger coverage.

9. The mobile device of claim 7,
wherein the processor is further configured to determine a fingerprint class from a captured at least one first image for matching the fingerprint hierarchically, and
wherein the memory is further configured to store the fingerprint class along with fingerprint features extracted for a registered fingerprint.

10. The mobile device of claim 9, wherein the fingerprint class comprises at least one of left loop, whorl, and right loop.

11. The mobile device of claim 7, wherein the at least one first image and the at least one second image correspond to partial horizontal finger scans and partial vertical finger scans, respectively.

12. The mobile device of claim 7,
wherein the display is configured to display the visual guidance for guiding to place one or more portions of a finger in one or more orientations, and
wherein the processor is further configured to:
receive the at least one first image by receiving the first fingerprint input of one or more portions of the finger in the first orientation,
receive the at least one second image by receiving the second fingerprint input of one or more portions of the finger in the second orientation, and
perform the authentication by authenticating a third fingerprint input of at least one portion of a finger of the user by comparing with the generated fingerprint image in at least one orientation.

13. The method of claim 1, wherein the performing of the authentication for the user comprises:
receiving a third fingerprint input in a third orientation;
determining if the third fingerprint input of the user in the third orientation corresponds to the fingerprint image; and
performing the authentication for the user based on the determination.

14. The mobile device of claim 7, wherein the processor is further configured to:
receive a third fingerprint input in a third orientation;
determine if the third fingerprint input of the user in the third orientation corresponds to the fingerprint image; and
perform the authentication for the user based on the determination.

15. The method of claim 1, wherein the displaying of the visual guidance comprises displaying the visual guidance for guiding to perform the first fingerprint input in the first orientation.

16. The method of claim 1, wherein the displaying of the visual guidance comprises displaying the visual guidance with a message for guiding to place a plurality of different portions of a finger.

17. The method of claim 16, wherein the visual guidance includes at least one fingerprint image or a video corresponding to the plurality of different portions of the finger.

18. The method of claim 1, further comprising:
determining if the second fingerprint input of the user is received in a right manner as the visual guidance; and
validating the second fingerprint input by calculating a relative rotation of the second fingerprint input with respect to the first orientation of the first fingerprint input.

19. The method of claim 1, wherein the visual guidance includes a text message.

20. The mobile device of claim 7, wherein the processor is further configured to control the display to display the visual guidance with the message for guiding to perform the fingerprint input in the first orientation.

21. The mobile device of claim 7, wherein the processor is further configured to control the display to display the visual guidance with a message for guiding to place a plurality of different portions of a finger.

22. The mobile device of claim 21, wherein the visual guidance includes at least one fingerprint image or a video corresponding to the plurality of different portions of the finger.

23. The mobile device of claim 7, wherein the processor is further configured to:
determine if the second fingerprint input of the user is received in a right manner as the visual guidance, and
validate the second fingerprint input by calculating a relative rotation of the second fingerprint input with respect to the first orientation of the first fingerprint input.

24. The mobile device of claim 7, wherein the visual guidance includes a text message.

25. The method of claim 1, wherein the performing of the authentication for the user comprises:
displaying a third visual guidance for guiding to perform a third finger print input in a third orientation for authentication;
determining if the third fingerprint input is received in the third orientation; and
validating the third fingerprint input by matching the third fingerprint input with respect to the generated fingerprint image based on the third orientation.

26. The mobile device of claim 7, wherein the processor is further configured to perform authentication for the user by:
- displaying a third visual guidance for guiding to perform a third finger print input in a third orientation for authentication;
- determining if the third fingerprint input is received in the third orientation; and
- validating the third fingerprint input by matching the third fingerprint input with respect to the generated fingerprint image based on the third orientation.

* * * * *